(12) United States Patent
Nagatani et al.

(10) Patent No.: US 6,538,865 B1
(45) Date of Patent: Mar. 25, 2003

(54) FAULT-DETECTING DEVICE FOR COMMUNICATION SYSTEM

(75) Inventors: Yuji Nagatani, Wako (JP); Kazuya Iwamoto, Wako (JP); Hiroshi Hashimoto, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 231 days.

(21) Appl. No.: 09/624,845

(22) Filed: Jul. 25, 2000

(51) Int. Cl.7 .............................. H02H 3/00; H02H 7/00
(52) U.S. Cl. ........................................................ 361/64
(58) Field of Search ........................... 361/64; 370/242, 370/248; 375/285, 296

(56) References Cited

U.S. PATENT DOCUMENTS

| | | | | |
|---|---|---|---|---|
| 5,268,907 A | * | 12/1993 | Suzuki et al. | 371/8.2 |
| 5,295,132 A | * | 3/1994 | Hashimoto et al. | 370/13 |
| 5,781,585 A | * | 7/1998 | Dorner et al. | 375/224 |
| 6,034,995 A | * | 3/2000 | Eisele et al. | 375/257 |
| 6,115,831 A | * | 9/2000 | Hanf et al. | 714/43 |
| 6,249,127 B1 | * | 6/2001 | Fluhrer | 324/543 |

* cited by examiner

Primary Examiner—Brian Sircus
Assistant Examiner—Z Kitov

(57) ABSTRACT

A fault-detecting device used in a communication system and capable of judging correctly that a fault exerting an adverse effect with certainty on the transmission/reception operation has occurred in two-wire transmission lines. The fault-detecting device compares magnitudes between levels of information signals inputted through each of the two-wire transmission lines to obtain a resulting value as a main reception signal; compares magnitudes between a level of information signals inputted through each of the two-wire transmission lines and a first or second threshold value to obtain a resulting value as a first or second individual reception signal; determines a mismatch between the main reception signal and the first individual reception signal at a predetermined timing and generating a first mismatch detection signal when the mismatch has occurred; generates a first fault detection signal indicating a fault in the one of the two-wire transmission lines in accordance with a frequency of occurrence of the first mismatch detection signal; determines a mismatch between the main reception signal and the second individual reception signal at the predetermined timing and generating a second mismatch detection signal when the mismatch has occurred; and generates a second fault detection signal indicating a fault in the other one of the two-wire transmission lines in accordance with a frequency of occurrence of the second mismatch detection signal.

3 Claims, 7 Drawing Sheets

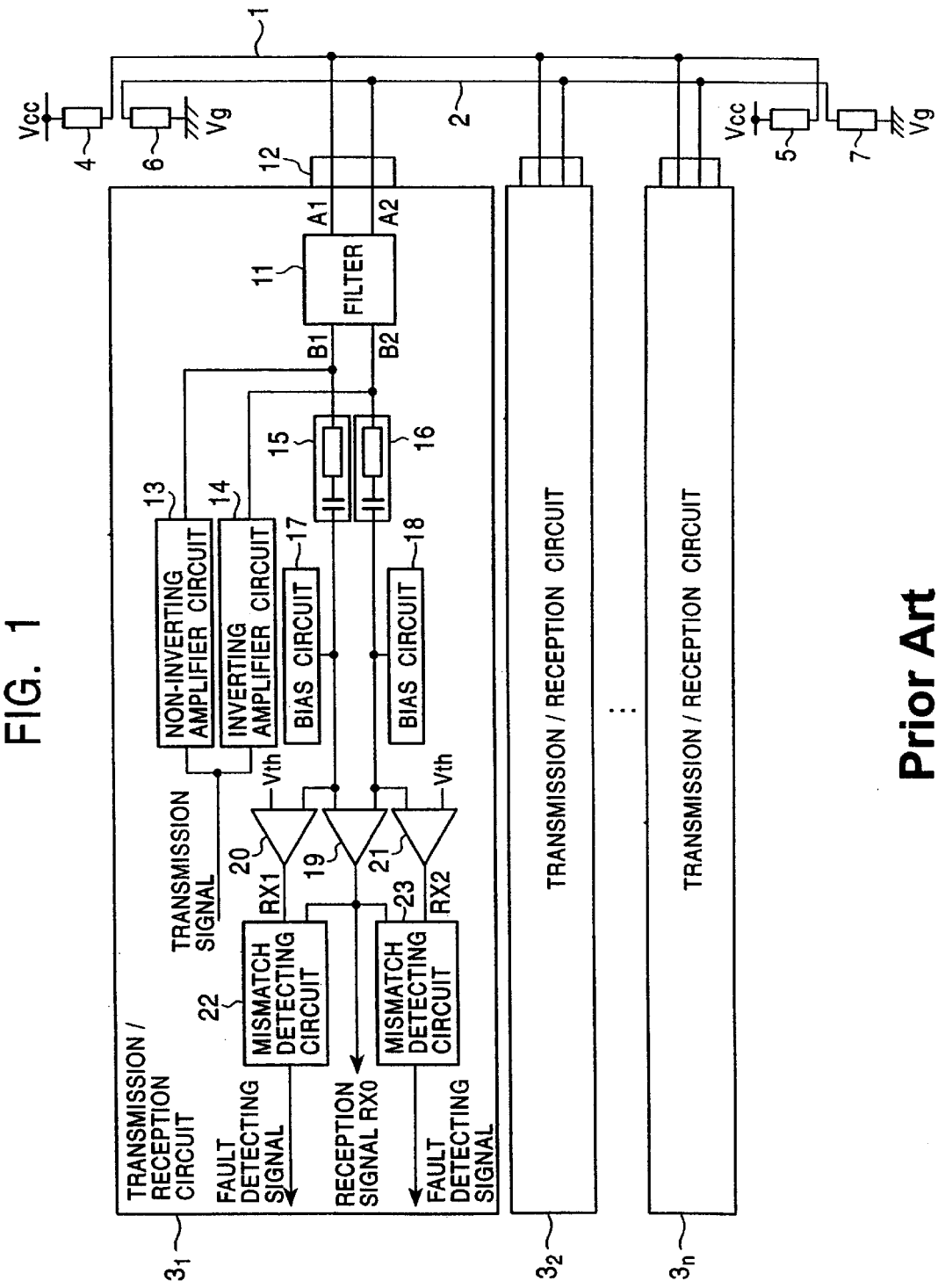

FIG. 2A
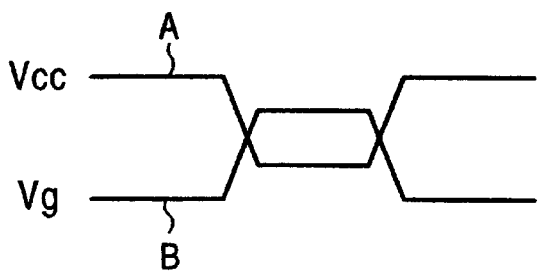
FIG. 2B
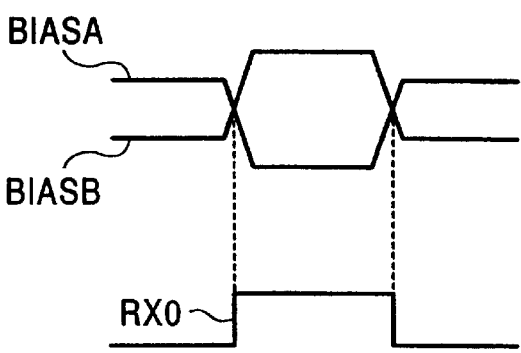
FIG. 2C
FIG. 2D
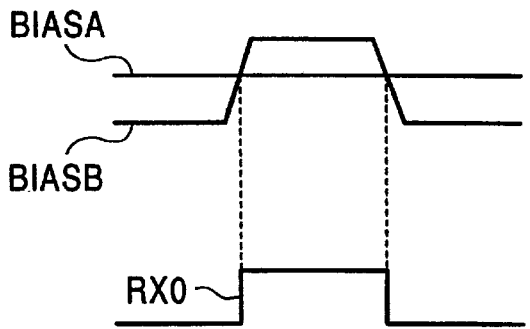
FIG. 2E
FIG. 2F
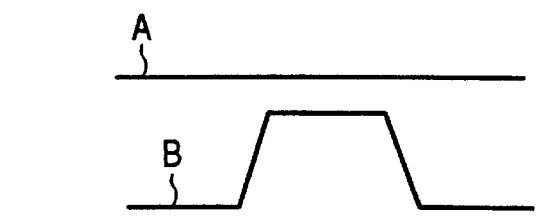
Prior Art

| | | |
|---|---|---|
| FIG. 4A | RX0 |  |
| FIG. 4B | RX1 |  |
| FIG. 4C | RX2 |  |
| FIG. 4D | OUTPUT OF THE MISMATCH DETECTING CIRCUIT 22 | 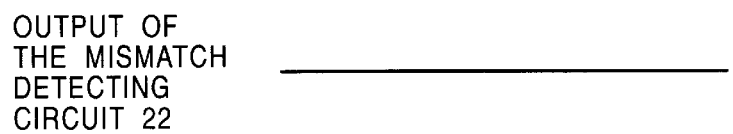 |
| FIG. 4E | OUTPUT OF THE MISMATCH DETECTING CIRCUIT 23 | 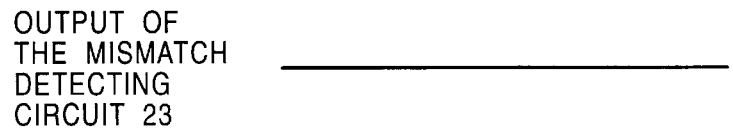 |
| FIG. 4F | COUNT OF THE COUNTER 31 | 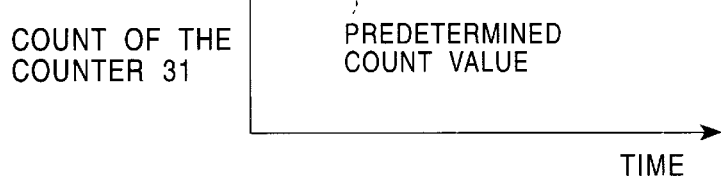 |
| FIG. 4G | COUNT OF THE COUNTER 32 | 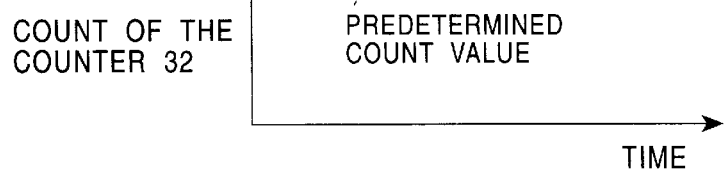 |

FIG. 5A RX0
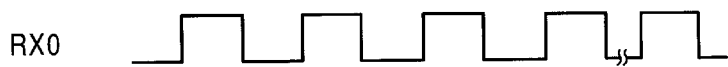
FIG. 5B RX1
FIG. 5C RX2
FIG. 5D OUTPUT OF THE MISMATCH DETECTING CIRCUIT 22
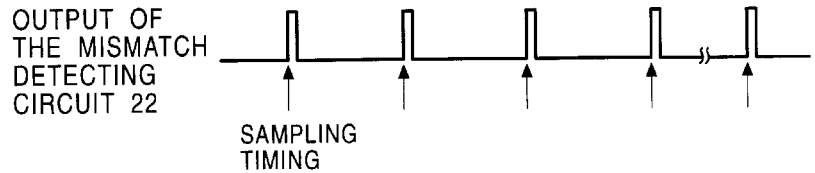
SAMPLING TIMING
FIG. 5E
FIG. 5F COUNT OF THE COUNTER 31
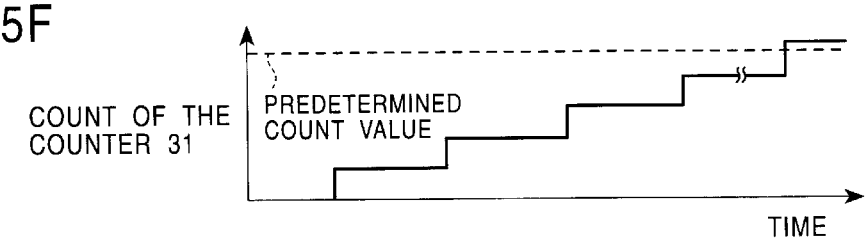
PREDETERMINED COUNT VALUE
TIME
FIG. 5G OUTPUT LEVEL OF THE COUNTER 31
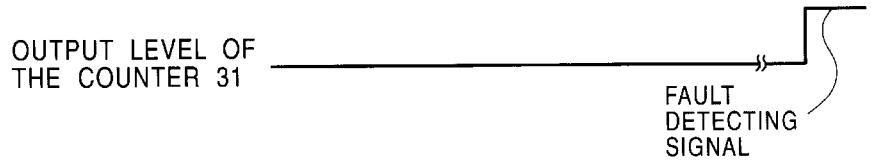
FAULT DETECTING SIGNAL

FAULT-DETECTING DEVICE FOR COMMUNICATION SYSTEM

BACKGROUND OF THE INVENTION

1. Field of the Invention

The present invention relates to a communication system that comprises a plurality of nodes connected in common to two-wire transmission lines and more particularly to a fault-detecting device for detecting a fault such as a break, a short circuit, and the like of transmission lines.

2. Detailed Description of the Related Art

As shown in FIG. 1, in a prior art communication system, two-wire transmission lines 1, 2 are connected with transmission/reception circuits $3_1$–$3_n$ at a plurality of nodes. All the transmission/reception circuits $3_1$–$3_n$ comprise the same components. Positive potential Vcc (for example, 5 V) is supplied to one end of the transmission line 1 via a terminal resistor 4 and positive potential Vcc is supplied to the other end via a terminal resistor 5 in the same way. Ground potential Vg (for example, 0V) is supplied to one end of the transmission line 2 via a terminal resistor 6 and ground potential Vg is supplied to the other end via a terminal resistor 7 in the same way.

In the transmission/reception circuit $3_1$, a two-way I/O filter 11 is connected to the transmission lines 1, 2 via a connector 12. Connecting terminals A1, A2 are provided for connecting the I/O filter 11 to the transmission lines 1, 2 and connecting terminals B1, B2 arranged as opposed to the connecting terminals A1, A2. A transmission signal is individually supplied to the connecting terminals B1, B2 via a non-inverting amplifier circuit 13 and an inverting amplifier circuit 14. In addition, bias circuits 17, 18 are connected to the connecting terminals B1, B2 of the filter 11 via AC coupling circuits 15, 16 which comprise a resistor and capacitor, respectively. Each of the signals provided by the bias circuits 17, 18 serves as a reception signal via a comparator 19.

Upon outputting the transmission signal, the signal is amplified by the non-inverting amplifier circuit 13 and amplified in an inverting manner by the inverting amplifier circuit 14 as well. Transmission signals opposite in phase to each other are supplied to the filter 11 from the non-inverting amplifier circuit 13 and the inverting amplifier circuit 14. The filter 11 serves as a low-pass filter to allow the transmission signals to pass individually therethrough. An output transmission signal from the non-inverting amplifier circuit 13 passes through the filter 11 and is thereafter supplied to the transmission line 2 as an information signal. An output transmission signal from the inverting amplifier circuit 14 passes through the filter 11 and is thereafter supplied to the transmission line 1 as an information signal.

On the other hand, the information signals, opposite in phase to each other and transmitted through each of the transmission lines 1, 2 are supplied to the filter 11. The filter 11 acts as a low-pass filter on each of these information signals to output the signals to the AC coupling circuits 15, 16. Each of the AC coupling circuits 15, 16 extracts AC components of the information signals and supplies the components to the bias circuits 17, 18, respectively.

For example, as shown in FIG. 2A, consider the case where a signal A transmitted through the transmission line 1 and a signal B transmitted through the transmission line 2 vary as opposed in phase to each other. As shown in FIG. 2B, the bias circuit 17 applies a bias voltage to the information signal A to obtain a biased signal BIASA, while the bias circuit 18 applies a bias voltage to the information signal B to obtain a biased signal BIASB. As shown in FIG. 2C, the comparator 19 detects each of the output signals BIASA, BIASB from the bias circuits 17, 18 as a reception signal RX0.

When a break has occurred in the transmission line 1, only signal B is transmitted in the transmission line 2. Accordingly, as shown in FIG. 2D, the biased signal BIASA remains constant, whereas the biased signal BIASB, transmitted through the transmission line 2, to which a bias voltage has been applied changes like the signal B. The comparator 19 compares the constant biased signal BIASA and the biased signal BIASB to obtain a reception signal as shown in FIG. 2E. This holds true even when the transmission line 1 is grounded or when the transmission line 2 is broken or grounded.

Incidentally, no reception signals could be detected without the bias circuits 17, 18 when a break occurs in the transmission line 1 since the signals A, B to be inputted into the comparator 19 would have the waveforms shown in FIG. 2F.

A fault detecting device for detecting a fault such as a break or a short circuit or the like on the transmission lines 1, 2 comprises comparators 20, 21 and mismatch detecting circuits 22, 23. The comparator 20 compares the biased signal BIASA with a threshold value Vth. A high level output is obtained when the biased signal BIASA is equal to or less than the threshold value Vth, whereas a low level output is obtained when the biased signal BIASA is greater than the threshold value Vth. The output is supplied to the mismatch detecting circuit 22 as an individual reception signal RX1. The mismatch detecting circuit 22 reads, in phase with a sampling clock, each of the reception signals RX0, RX1 of the comparators 19, 20. The mismatch detecting circuit 22 provides a low level output when the levels of the read reception signals RX0, RX1 coincide with each other. On the other hand, when the levels of the reception signals RX0, RX1 do not coincide with each other, the mismatch detecting circuit 22 provides a high level output that shows that a fault has occurred on the transmission line 1.

Likewise, the comparator 21 compares the biased signal BIASB with the threshold value Vth. A low level output is obtained when the biased signal BIASB is equal to or less than the threshold value Vth, whereas a high level output is obtained when the biased signal BIASB is greater than the threshold value Vth. The output is supplied to the mismatch detecting circuit 23 as an individual reception signal RX2. The mismatch detecting circuit 23 reads, in phase with the sampling clock, each of the reception signals RX0, RX2 of the comparators 19, 21. The mismatch detecting circuit 23 provides a low level output when the levels of the read reception signals RX0, RX2 coincide with each other. On the other hand, when the levels of the reception signals RX0, RX2 do not coincide with each other, the mismatch detecting circuit 23 provides a high level output that shows that a fault has occurred on the transmission line 2.

In response to the high-level output showing a fault, for example, the transmission/reception circuit $3_1$ activates fault corrective functions such as generating an alarm or stopping transmission and/or reception operation.

Other transmission/reception circuits $3_2$–$3_n$ also have the same configuration and functions as those of the transmission/reception circuit $3_1$. Incidentally, a device that detects a fault on a transmission line based on signal levels are disclosed in Japanese Patent Laid-Open Publications No. Hei 5-147479 and No.Hei 5-75629.

However, once it is detected that the level of the signal transmitted through the transmission line 1 or 2 is abnormal in such prior art fault-detecting device of a communication system, the device judges immediately that a fault has occurred in the transmission line 1 or 2. Accordingly, even a disturbance such as a noise that would never exert an adverse effect on the transmission/reception operation of the system would cause the device to judge that a fault occurred in the transmission line 1 or 2. This would cause the fault corrective functions to work unnecessarily.

OBJECTS AND SUMMARY OF THE INVENTION

In view of the aforementioned circumstances, an object of the present invention is to provide a fault-detecting device for a communication system that can judge correctly that a fault has occurred in two-wire transmission lines, which affects adversely with certainty the transmission/reception operation thereof.

A fault-detecting device of the present invention for a communication system using two-wire transmission lines for transmitting information signals opposite in phase to each other is characterized by comprising first comparator means for comparing magnitudes between levels of information signals inputted through each of the two-wire transmission lines to obtain a resulting value as a main reception signal; second comparator means for comparing magnitudes between a level of an information signal inputted through one of the two-wire transmission lines and a first threshold value to obtain a resulting value as a first individual reception signal; third comparator means for comparing magnitudes between a level of an information signal inputted through the other one of the two-wire transmission lines and a second threshold value to obtain a resulting value as a second individual reception signal; first mismatch detecting means for determining a mismatch between the main reception signal and the first individual reception signal at a predetermined timing and generating a first mismatch detection signal when the mismatch has occurred; first frequency determining means for generating a first fault detection signal indicating a fault in the one of the two-wire transmission lines in accordance with a frequency of occurrence of the first mismatch detection signal; second mismatch detecting means for determining a mismatch between the main reception signal and the second individual reception signal at the predetermined timing and generating a second mismatch detection signal when the mismatch has occurred; and second frequency determining means for generating a second fault detection signal indicating a fault in the other one of the two-wire transmission lines in accordance with a frequency of occurrence of the second mismatch detection signal.

According to such fault-detecting device of the present invention, since a main reception signal and a first individual reception signal have generally the same waveform when there is no fault on one of the transmission lines, a first mismatch detection signal is generated when a mismatch between the main reception signal and the first individual reception signal has occurred and determined at a predetermined timing. Then, a first fault detection signal that indicates the occurrence of a fault in the one transmission line is generated in accordance with the frequency of occurrence of the first mismatch detection signal. On the other hand, a second mismatch detection signal is generated when a mismatch between the main reception signal and a second individual reception signal has occurred and determined at a predetermined timing since the main reception signal and the second individual reception signal have generally the same waveform when there is no fault on the other one of the two-wire transmission lines. Then, a second fault detection signal that indicates the occurrence of a fault in the other transmission line is generated in accordance with the frequency of occurrence of the second mismatch detection signal. Accordingly, even when a mismatch between the main reception signal and the first or second individual reception signal is once detected, a fault detection signal is not immediately generated. Therefore, this makes it possible to judge correctly that a fault that exerts an adverse effect with certainty on the transmission/reception operation has occurred in two-wire transmission lines.

The first frequency determining means comprise a first counter for counting the number of times of occurrence of the first mismatch detection signal and generating the first fault detection signal when the counted number has exceeded a predetermined count value. On the other hand, the second frequency determining means comprise a second counter for counting the number of times of occurrence of the second mismatch detection signal and generating the second fault detection signal when the counted number has exceeded the predetermined count value.

Furthermore, the first frequency determining means comprise a first frequency-voltage converter for converting a frequency of occurrence of the first mismatch detection signal and fourth comparator means for generating the first fault detection signal when an output voltage of the first frequency-voltage converter has exceeded a predetermined voltage. On the other hand, the second frequency determining means comprise a second frequency-voltage converter for converting a frequency of occurrence of the second mismatch detection signal and fifth comparator means for generating the second fault detection signal when an output voltage of the second frequency-voltage converter has exceeded the predetermined voltage.

BRIEF DESCRIPTION OF THE DRAWINGS

FIG. 1 is a block diagram showing a prior art communication system.

FIGS. 2A to 2F are views showing waveforms of transmitted signals in a prior art communication system.

FIGS. 4A to 4G are views of waveforms showing the operation of the device of FIG. 3.

FIGS. 5A to 5G are views of waveforms showing the operation of the device of FIG. 3.

DETAILED DESCRIPTION OF THE PREFERRED EMBODIMENTS

Embodiments of the present invention will be explained below in detail with reference to the drawings.

Figure 3:
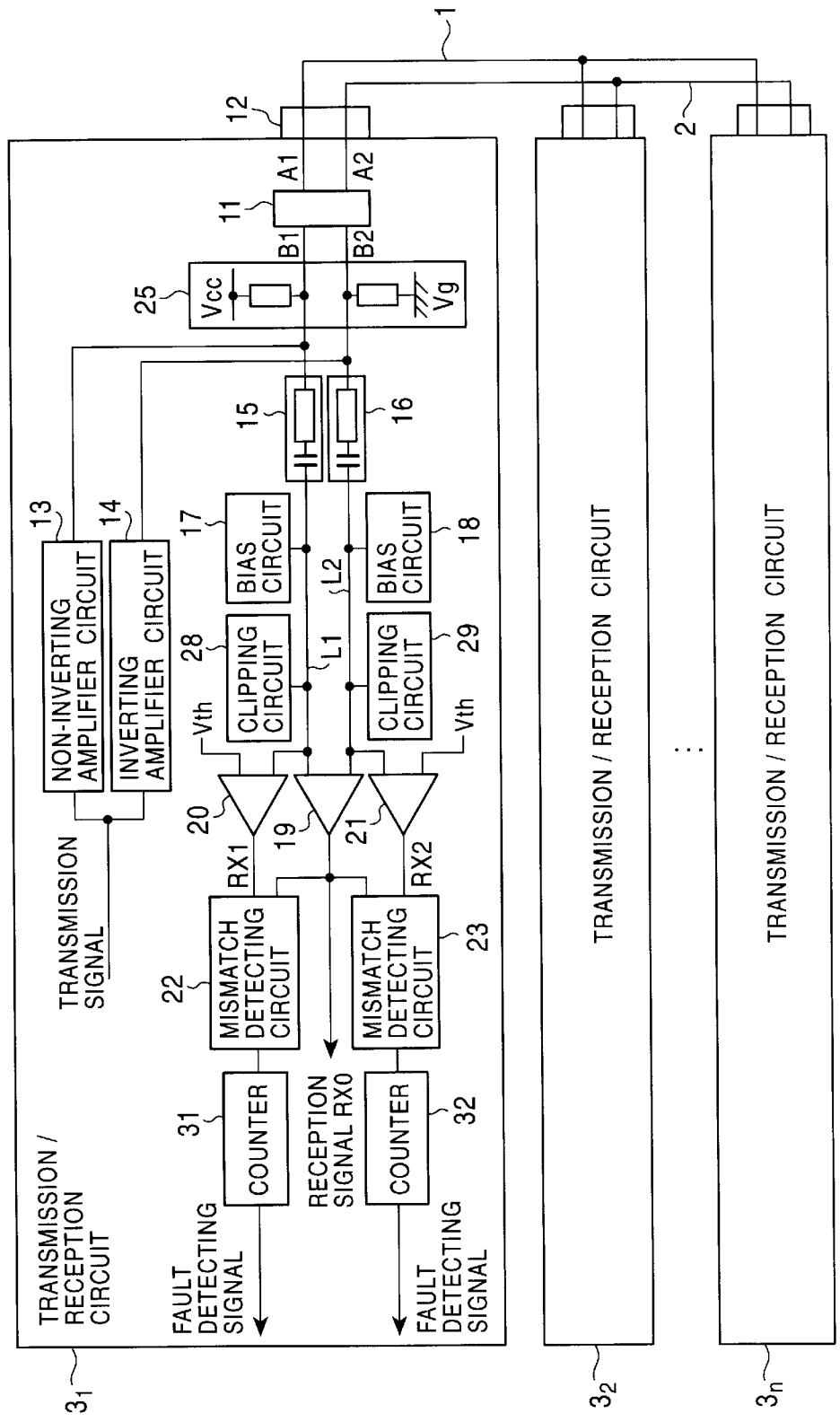
FIG. 3 is a block diagram showing an embodiment according to the present invention.

FIG. 3 shows a communication system having fault-detecting devices according to the present invention, where the reference symbols that designate the same components as those of the prior art communication system shown in FIG. 1 remain the same.

In the transmission/reception circuit $3_1$, the inverting amplifier circuit 14 and the AC coupling circuit 15 are connected to the connecting terminal B1 that is provided as opposed to the connecting terminals A1, A2 that connect the filter 11 to the transmission lines 1, 2. On the other hand, the non-inverting amplifier circuit 13 and the AC coupling circuit 16 are connected to the connecting terminal B2. This is the same configuration as the prior art system. In the communication system according to the present invention, a distributed terminal circuit 25 is further connected to the connecting terminals B1, B2. The distributed terminal circuit 25 includes terminal resistors 26, 27. The terminal resistor 26 is adapted to supply the positive potential Vcc to the connecting terminal B1, while the terminal resistor 27 is adapted to supply the ground potential Vg to the connecting terminal B2. Incidentally, the two-wire transmission lines 1, 2 are not directly connected with terminal resistors.

Lines L1, L2 that lead from the AC coupling circuits 15, 16 to the comparator 19 corresponding to first comparator means are connected with the bias circuits 17, 18 and clipping circuits 28, 29 as well. When the biased signal BIASA of the line L1 is less than a first clipping level CLIP1, the clipping circuit 28 limits the biased signal BIASA to the first clipping level CLIP1. On the other hand, when the biased signal BIASB of the line L2 is greater than a second clipping level CLIP2, the clipping circuit 29 limits the biased signal BIASB to the second clipping level CLIP2.

The fault-detecting device includes the comparators 20, 21 and mismatch detecting circuits 22, 23 as well as counters 31, 32. The comparators 20, 21 correspond to second and third comparator means, the mismatch detecting circuits 22, 23 correspond to first and second mismatch detecting means, respectively. The counter 31 is connected to the output of the mismatch detecting circuit 22 to count the number of the high level outputs from the mismatch detecting circuit 22 and then generate a first fault detection signal when a predetermined count value has been reached. The counter 32 is connected to the output of the mismatch detecting circuit 23 to count the number of the high level outputs from the mismatch detecting circuit 23 and then generate a second fault detection signal when a predetermined count value has been reached.

Other configuration of the system is the same as that of the prior art communication system shown in FIG. 1. Moreover, the transmission/reception circuits $3_2$–$3_n$ have the same configuration as that of the transmission/reception circuits $3_1$.

In the communication system configured as described above, upon outputting the transmission signal, the signal is amplified by the non-inverting amplifier circuit 13 and amplified in an inverting manner by the inverting amplifier circuit 14 as well. Transmission signals opposite in the phase to each other are supplied to the filter 11 from the non-inverting amplifier circuit 13 and the inverting amplifier circuit 14. The filter 11 serves as a low-pass filter to allow the transmission signals to pass individually therethrough. An output transmission signal from the non-inverting amplifier circuit 13 passes through the filter 11 and is thereafter supplied to the transmission line 2 as an information signal. An output transmission signal from the inverting amplifier circuit 14 passes through the filter 11 and is thereafter supplied to the transmission line 1 as an information signal.

On the other hand, the information signals transmitted through each of the transmission lines 1, 2 are supplied to the filter 11. The filter 11 acts as a low-pass filter on each of these information signals to output the signals to the AC coupling circuits 15, 16. Each of the AC coupling circuits 15, 16 extracts AC components of the information signals and supplies the components to the bias circuits 17, 18, respectively. As shown in FIG. 2B the bias circuit 17 applies a bias voltage to the information signal A to obtain the biased signal BIASA, while the bias circuit 18 applies a bias voltage to the information signal B to obtain the biased signal BIASB.

When the biased signal BIASA of the line L1 is less than the first clipping level CLIP1, the clipping circuit 28 limits the biased signal BIASA to the first clipping level CLIP1. On the other hand, when the biased signal BIASB of the line L2 is greater than the second clipping level CLIP2, the clipping circuit 29 limits the biased signal BIASB to the second clipping level CLIP2.

Such biased signals BIASA, BIASB are supplied to the comparator 19, and then the comparator 19 detects the signals as the reception signal (main reception signal) RX0 in the same manner as in the prior art system. The comparator 20 compares the biased signal BIASA with a threshold value Vth. A high level output is obtained when the biased signal BIASA is equal to or less than the threshold value Vth, whereas a low level output is obtained when the biased signal BIASA is greater than the threshold value Vth. The output is supplied to the mismatch detecting circuit 22 as an individual reception signal RX1. Incidentally, the threshold values Vth of the comparators 20, 21 are the same to each other in this embodiment, however, the values may be different.

The mismatch detecting circuit 22 reads, in phase with a sampling clock, each of the reception signals RX0, RX1 of the comparators 19, 20. The mismatch detecting circuit 22 provides a low level output when the levels of the read reception signals RX0, RX1 coincide with each other. On the other hand, when the levels of the reception signals RX0, RX1 do not coincide with each other, the mismatch detecting circuit 22 provides a high level output that shows abnormality. The sampling clock is generated in accordance with the reception signal RX0. For example, the sampling clock is generated after a delay of a predetermined time from the rising edge of the reception signal RX0. The predetermined time is shorter than the time from the rising edge to the falling edge of the reception signal RX0.

The counter 31 counts the rising edge of the high level outputs from the mismatch detecting circuit 22. When a predetermined count value has been reached (for example, 5), the counter 31 generates a fault detection signal to indicate that a fault has occurred on the transmission line 1.

Likewise, the comparator 21 compares the biased signal BIASB with the threshold value Vth. A low level output is obtained when the biased signal BIASB is equal to or less than the threshold value Vth, whereas a high level output is obtained when the biased signal BIASB is greater than the threshold value Vth. The output is supplied to the mismatch detecting circuit 23 as an individual reception signal RX2. The mismatch detecting circuit 23 reads, in phase with the sampling clock, each of the reception signals RX0, RX2 of the comparators 19, 21. The mismatch detecting circuit 23 provides a low level output when the levels of the read reception signals RX0, RX2 coincide with each other. On the other hand, when the levels of the reception signals RX0, RX2 do not coincide with each other, the mismatch detecting circuit 23 provides a high level output that shows abnormality.

The counter 32 counts the rising edge of the high level outputs from the mismatch detecting circuit 23. When a predetermined count value has been reached (for example, 5), the counter 32 generates a fault detection signal to indicate that a fault has occurred on the transmission line 2.

Now, consider the case where there is no fault on the transmission lines 1, 2 and the reception signals RX0, RX1, RX2, having generally the same waveform as shown in FIGS. 4A–4C, are detected normally. In this case, each of the output levels of the mismatch detecting circuits 22, 23 are kept at a low level. Accordingly, the count of the counters 31, 32 remains the same as the initial value (0) as shown in FIGS. 4F and 4G.

However, when a break or a short circuit has occurred on the transmission line 1 to make the biased signal BIASA greater than the threshold value Vth, the comparator 20 provides a low level signal or the reception signal RX1 as shown in FIG. 5B. If the transmission line 2 works properly then, the comparators 19, 20 detect the reception signals RX0, RX2 as shown in FIGS. 5A–5C. Since the reception signal RX0 and the reception signal RX1 do not coincide with each other in waveform, the mismatch detecting circuit 22 generates a high level output as shown in FIG. 5D when the inconsistency occurs or the reception signal RX0 is at a high level. Since the reception signal RX0 and the reception signal RX2 coincide with each other in waveform, the output level of the mismatch detecting circuit 23 is sustained at a low level as shown in FIG. 5E. The counter 31 counts the high level pulses of the mismatch detecting circuit 22 and the count value is increased every high level pulse as shown in FIG. 5F. When the predetermined count value of the counter 31 has been exceeded, a high-level fault detection signal is generated as shown in FIG. 5G.

Incidentally, the counters 31, 32 are adapted to be reset when no high level signals are supplied thereto from the mismatch detecting circuits 22, 23 for a predetermined time.

Figure 6:
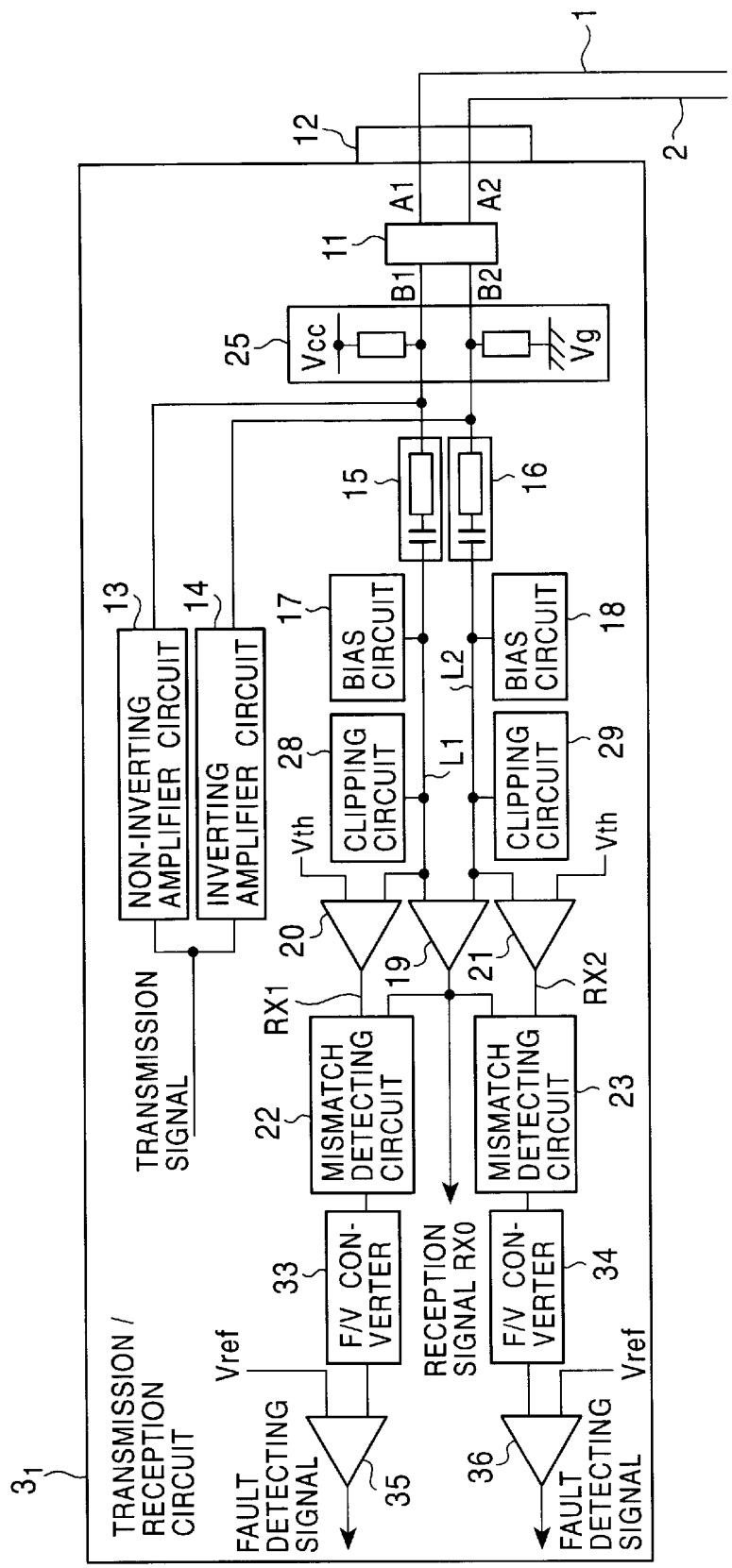
FIG. 6 is a block diagram showing another embodiment according to the present invention.

FIG. 6 shows another embodiment of the present invention. The communication system shown in FIG. 6 is provided with F/V converters 33, 34 in place of the counters 31, 32 of FIG. 3 and comparators 35, 36. The F/V converter 33 is connected to the output of the mismatch detecting circuit 22. When high level pulses are generated one after another from the mismatch detecting circuit 22, the F/V converter 33 generates a voltage corresponding to the frequency of generation of the pulses. The comparator 35 compares the output voltage of the F/V converter 33 with a predetermined voltage Vref (corresponding to a predetermined value) and generates a fault detection signal when the output voltage of the F/V converter 33 has exceeded the predetermined voltage Vref. Likewise, the F/V converter 34 is connected to the output of the mismatch detecting circuit 23. When high level pulses are generated one after another from the mismatch detecting circuit 23, the F/V converter 34 generates a voltage corresponding to the frequency of generation of the pulses. The comparator 36 compares the output voltage of the F/V converter 34 with the predetermined voltage Vref and generates a fault detection signal when the output voltage of the F/V converter 34 has exceeded the predetermined voltage Vref.

Figure 7:
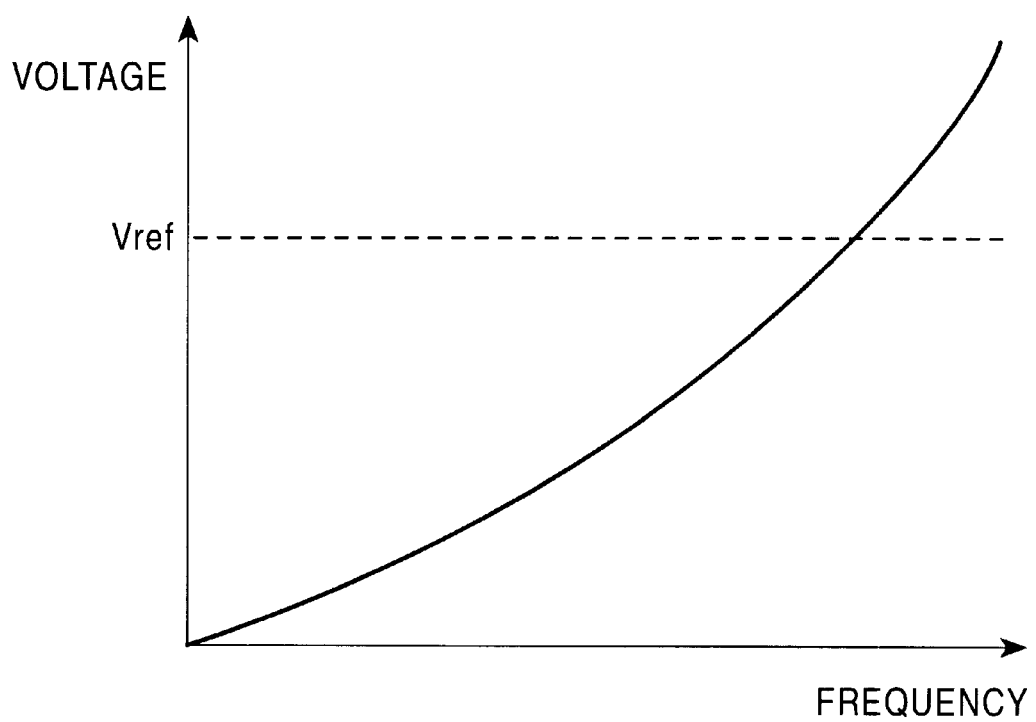
FIG. 7 is a plot showing the frequency—voltage characteristic of an F/V converter.

Now, consider the case where there is no fault on the transmission lines 1, 2 and the reception signals RX0, RX1, having generally the same waveform as shown in FIGS. 4A and 4B, are detected normally. In this case, the output level of the mismatch detecting circuit 22 is kept at a low level, so that the output voltage of the F/V converter 33 becomes 0V. On the other hand, the mismatch detecting circuit 22 generates high level pulses as shown in FIG. 5D when a break or a short circuit has occurred on the transmission line 1 and the reception signals RX0, RX1 do not coincide with each other as shown in FIGS. 5A and 5B. Accordingly, the output voltage of the F/V converter 33 increases in accordance with the frequency of generation of the high level pulses. The relation between the input frequency and the output voltage of the F/V converter 33 is as shown in FIG. 7. The comparator 35 generates a fault detection signal when the frequency of generation of high level pulses has increased to cause the output voltage of the F/V converter 33 to exceed the predetermined voltage Vref. The F/V converter 34 and the comparator 36 operate in the same way as in the case of the transmission line 1 to detect a fault in the transmission line 2.

As described above, according to the present invention, since a main reception signal and a first individual reception signal have generally the same waveform when there is no fault on one of two-wire transmission lines, a first mismatch detection signal is generated when a mismatch between the main reception signal and the first individual reception signal has occurred and determined at a predetermined timing. Then, a first fault detection signal that indicates the occurrence of a fault in the one transmission line is generated in accordance with the frequency of occurrence of the first mismatch detection signal. On the other hand, a second mismatch detection signal is generated when a mismatch between the main reception signal and a second individual reception signal has occurred and determined at a predetermined timing since the main reception signal and the second individual reception signal have generally the same waveform when there is no fault on the other one of the two-wire transmission lines. Then, a second fault detection signal that indicates the occurrence of a fault in the other transmission line is generated in accordance with the frequency of occurrence of the second mismatch detection signal. Accordingly, even when a mismatch between the main reception signal and the first or second individual reception signal is once detected due to a disturbance noise, a fault detection signal is not immediately generated. Therefore, this makes it possible to judge correctly that a fault that exerts an adverse effect with certainty on the transmission/reception operation has occurred in two-wire transmission lines.

What is claimed is:

1. A fault-detecting device for a communication system using two-wire transmission lines for transmitting information signals opposite in phase to each other, comprising:

first comparator means for comparing magnitudes between levels of information signals inputted through each of said two-wire transmission lines to obtain a resulting value as a main reception signal, second comparator means for comparing magnitudes between a level of an information signal inputted through one of said two-wire transmission lines and a first threshold value to obtain a resulting value as a first individual reception signal, third comparator means for comparing magnitudes between a level of an information signal inputted through the other one of said two-wire transmission lines and a second threshold value to obtain a resulting value as a second individual reception signal, first mismatch detecting means for determining a mismatch between said main reception signal and said first individual reception signal at a predetermined timing and generating a first mismatch detection signal when the mismatch has occurred, first frequency determining means responsive to the first mismatch detection signal for generating a first fault detection signal indicating a fault in the one of said two-wire transmission lines in accordance with a frequency of occurrence of said first mismatch detection signal, second mismatch detecting means for determining a mismatch between said main reception signal and said second individual reception signal at said predetermined timing and generating a second mismatch detection signal when the mismatch has occurred, and second frequency determining means responsive to the second mismatch detection signal for generating a second fault detection signal indicating a fault in the other one of said two-wire transmission lines in accordance with a frequency of occurrence of said second mismatch detection signal.

2. The fault-detecting device according to claim 1, wherein said first frequency determining means comprise a first counter for counting the number of times of occurrence of said first mismatch detection signal and generating said first fault detection signal when the counted number has exceeded a predetermined count value, and said second frequency determining means comprise a second counter for counting the number of times of occurrence of said second mismatch detection signal and generating said second fault detection signal when the counted number has exceeded said predetermined count value.

3. The fault-detecting device according to claim 1, wherein said first frequency determining means comprise a first frequency-voltage converter for converting a frequency of occurrence of said first mismatch detection signal and fourth comparator means for generating said first fault detection signal when an output voltage of said first frequency-voltage converter has exceeded a predetermined voltage, and said second frequency determining means comprise a second frequency-voltage converter for converting a frequency of occurrence of said second mismatch detection signal and fifth comparator means for generating said second fault detection signal when an output voltage of said second frequency-voltage converter has exceeded said predetermined voltage.

\* \* \* \* \*